Dec. 8, 1953 G. E. HANSEN 2,661,759
BACKFLOW PREVENTER FOR WATER HYDRANTS
Filed Oct. 16, 1948
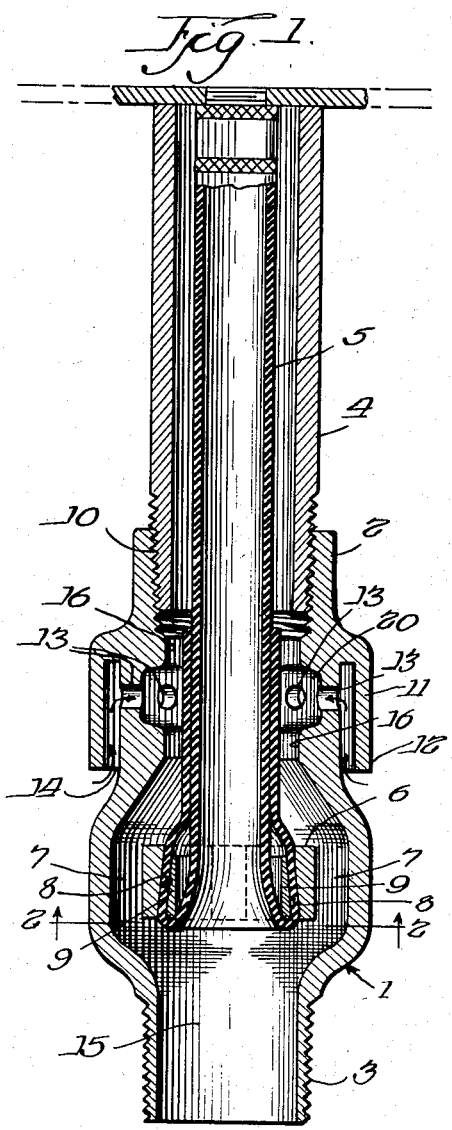
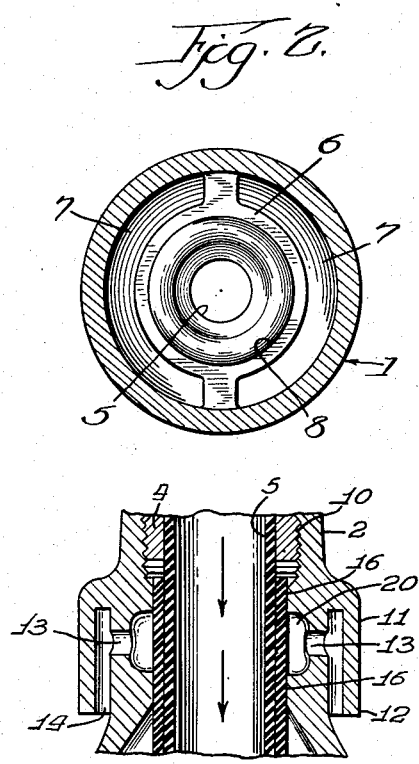
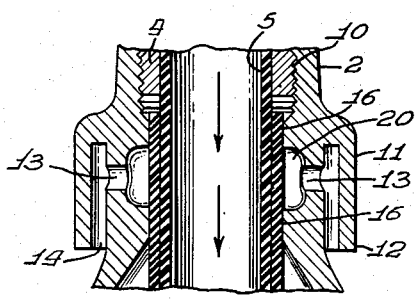
Inventor.
George E. Hansen.
By Joseph O. Lange
Atty.

Patented Dec. 8, 1953

2,661,759

UNITED STATES PATENT OFFICE 2,661,759

BACKFLOW PREVENTER FOR WATER HYDRANTS

George E. Hansen, Chicago, Ill., assignor to Crane Co., Chicago, Ill., a corporation of Illinois Application October 16, 1948, Serial No. 54,923

6 Claims. (Cl. 137—217)

This invention relates broadly to a back flow preventer. More particularly, it is concerned with a novel form of such device preferably employed in connection with a water hydrant or the like wherein an ample flow of water is provided and preferably having an air inlet leading from the water passageway to the surrounding atmosphere whereby a vacuum may be broken in the event of its occurrence by the admission of air and thus prevent the back flow of contaminated water into the fresh water supply.

One of the more important objects of this invention is to provide for a construction in which the use of the inlet supply as, for example, an expandible rubber hose, permits the collapse of the latter to open the air ports in the event of a vacuum occurring within the pipe line.

Another important object is to provide for an economical and improved vacuum breaker easily adaptable for use especially with water hydrants.

A further object is to provide the use of a construction avoiding baffles and other of the usual forms of obstruction in the pipe line.

Another object is to obtain a construction in which the article may not only be economically assembled but also manufactured conveniently and assembled.

Other advantages will become more readily apparent upon proceeding with the following description read in light of the accompanying drawings, in which:

Fig. 1 is a sectional assembly view of a preferred form of my invention during air admission for vacuum breaking.

Fig. 2 is a transverse sectional view taken on the line 2—2 of Fig. 1.

Fig. 3 is a fragmentary sectional view during water flow therethrough.

Similar reference numerals refer to similar parts throughout the several figures.

Referring now to Fig. 1, the body or casing generally designated 1 is provided with the usual inlet and outlet ends 2 and 3 for connection to a pipe line, the inlet being threadedly connected at 10 to an outer protecting pipe 4 in which is contained the flexible and normally expandible tubing 5 fixedly connected by any conventional means as shown to a source of supply (not shown). The connecting end 3 is attached to the outlet pipe (not shown). At its lowermost end within the casing 1 the tubing 5 is preferably folded over within the bridge or spider member 6, the shape in plan of which is shown more clearly in Fig. 2, the spider having the air passages 7 and being provided with the tapered surface or seat 8 to receive the similarly tapered ferrule 9. The end of the tube 5 preferably is folded over between the respective tapered surfaces of the ferrule 9 and the inner seat 8 of spider 6 so that when the tubing is assembled and drawn longitudinally upward it tends to pull the ferrule more tightly upward within the tapered surface 8 of the spider 6 thereby to create a leakproof joint as shown. Thus, the spider 6 functions to hold the lower end of the tubing 5 against substantial longitudinal movement upon the occurrence of fluid pressure building up within the interior of the said tubing, it being understood that at the inlet end the tubing 5 is fixedly connected by a suitable connection or joint as shown. Holding the tubing fixedly at each end thereof retains the latter so as to be axially immovable and, therefore, it is only expandible outwardly against the annular surfaces 16 to close the apertures 13 against liquid flow when pressure occurs. At the upper end of the casing 1 but in a plane below the inlet connection 2 there is provided the preferably integral hood or cover 11 for the purpose of providing an air inlet, the lowermost peripheral or shroud portion being designated 12 and which is spaced apart annularly from the casing to provide the air inlet chamber 14 extending upwardly within the cover 11. The latter chamber is in communication with the interior of the casing by means of the annularly positioned air inlet ports 13. The shape and the number of the air inlet ports may, of course, vary with the volume of water being supplied through the flexible inlet supply tubing 5. The length of the folded portion of the tubing 5 may likewise be substantially shorter than that illustrated; this, too, will vary with the nature of the installation.

Considering the operation of this device, it should be understood that as the flow of the liquid moves in the direction of the arrows downwardly within the flexible tubing 5 the latter member will be expanded as shown more clearly in Fig. 3 depending upon the internal pressure developed within it thereby to contact and seal the inner annular surfaces 16 to positively prevent the escape of liquid outwardly into atmosphere.

It has been found that even under relatively low pressure flow the escape of liquid will be effectually stopped.

Moreover, in the event of the occurrence of a vacuum it has been found that the tubing 5 will immediately collapse and assume the position as shown in Fig. 1, thereby allowing for the air to move inwardly from the outside atmosphere into the annular chamber 14 through the ports 13 and into the chamber 20 defined by the outer walls, then moving downwardly past the ports 7 of the spider 6 and into the lower supply chamber 15. The result is to effectively break any vacuum otherwise tending to occur, by the quick and adequate entry of air into the supply line, whereby backflow due to back siphonage is prevented.

Other modifications may, of course, be employed in valves with interior short rubber lengths and come within the spirit and the scope of the appended claims.

I claim:

1. In a backflow preventer, the combination including a casing having an inlet and an outlet, a spider element between said inlet and said outlet, air inlet means positioned adjacent the inlet end of said casing, the said spider element being positioned downstream of the said air inlet means and having a central apertured portion, a ferrule receivable within the central apertured portion of the said spider element, a flexible tube rigidly secured to the casing inlet and folded back on itself so that the inner portion thereof serves as a water delivery tube, the said spider being located in proximity with the fold in the flexible tube, the said ferrule cooperating with the said spider element to hold the tube in place, air inlet ports around the flexible tube adjacent the air inlet means, the air inlet means and air ports being located between the casing inlet and the said spider, the outer portion of the said flexible tube serving as a valve for the air inlet ports, the said air inlet means, said air inlet ports and casing outlet being in communication whereby upon the occurrence of a vacuum within the outlet end of the casing the flexible tube is collapsed thereby to permit the entry of air through the said air inlet ports.

2. In a backflow preventer, the combination including a casing having an inlet and an outlet, a spider structure between said inlet and said outlet, air inlet means positioned near the inlet end of said casing, the said spider structure having an annularly tapered central aperture, a ferrule receivable within the said spider structure aperture, a normally expanded flexible tube rigidly secured to the casing inlet and folded back on itself so that the inner portion acts as a water delivery tube discharging through the spider aperture, air inlet ports arranged around the flexible tube, the air inlet means and air ports being located between the casing inlet and the said spider, the casing providing an annular chamber between the flexible tube and the said air inlet ports, the outer portion of the flexible tube serving as a valve for the said air admission ports, the said spider being positioned downstream of the air inlet and in proximity with the fold in the tubing, the said ferrule cooperating with the said spider structure to hold the tubing in place, the said air inlet means, the said air inlet ports and casing outlet being in communication, the said flexible tube collapsing upon the occurrence of a vacuum thereby to permit the entry of air through the said inlet ports and into said casing to break the vacuum.

3. In a backflow preventer for water hydrants and the like, the combination including a casing having an inlet and an outlet, annular air inlet means positioned near the inlet end of the casing, a centrally ported spider structure between said inlet and outlet and positioned downstream of the said annular air inlet means, a ferrule within the port of said spider, a flexible tube rigidly secured to the casing inlet and folded back on itself so that the inner portion thereof acts as a water delivery tube through the spider structure, the outer portion of said flexible tube serving as a valve for the said annular air inlet means, the spider structure being positioned in proximity with the fold in the said tube, the said ferrule cooperating with the said spider structure to hold the tube in place, the flexible tube being normally expanded upon the occurrence of fluid flow therethrough to form upon such expansion a leakproof annular contact with the casing below the annular air inlet means, air inlet ports arranged around a portion of the flexible tube adjacent the air inlet means, the air inlet means and air ports being located between the casing inlet and the said spider, the said air inlet means, the said air inlet ports and casing outlet being in communication whereby backflow due to back siphonage is prevented by the flexible tube collapsing to break the leakproof annular contact with the casing and thereby permit the entry of air through the said air inlet ports into the casing.

4. In a backflow preventer, the combination including a casing having an inlet and an outlet, a spider between said inlet and outlet, hooded air inlet means positioned near the inlet end, a ferrule telescopically receivable within a central portion of the said spider, a flexible tube rigidly secured to the casing inlet and folded back on itself so that the inner portion acts as a water delivery tube within the casing, the said spider cooperating with the said ferrule to hold the said flexible tube in place, the said spider member being positioned within the casing downstream of the said hooded air inlet means and located in proximity with the fold in the tube, air inlet passages annularly spaced apart from the flexible tube above the telescopic assembly of the said spider and the said ferrule, the said tube normally being expanded upon the occurrence of fluid flow therethrough, the air inlet means and air inlet passages being located between the casing inlet and the said spider, the said air inlet means, the said air inlet passages and casing outlet being in communication whereby upon the occurrence of a vacuum the said tube is substantially reduced in diameter and thereby effects an annular space between an inner wall portion of the casing adjacent the air inlet means and the outside diameter of the folded tube to permit the entry of air through the hooded air inlet means and the air inlet passages.

5. In a backflow preventer, the combination including a casing having an inlet and an outlet, a spider between said inlet and said outlet, annularly arranged air inlet means adjacent the casing inlet end, the said spider having a tapered aperture therethrough, a ferrule within the spider aperture, a flexible tube rigidly secured to the casing inlet and folded back on itself between the said ferrule and the tapered aperture portion of said spider, the inner portion of said tube acting as a water delivery into a central part of the casing and the outer portion thereof serving as a valve for the said annularly arranged air inlet means, the said flexible tube being expandible under normal fluid flow therethrough, casing ports communicating with said air inlet means adjacent the expandable portion of the flexible tube, the said spider being positioned downstream of the casing ports in proximity with the fold of the flexible tube, the air inlet means and casing ports being located between the casing inlet and the said spider, the said air inlet means, the casing ports and the casing outlet being in communication whereby the collapse of the said flexible tube upon the occurrence of a vacuum effects movement of a peripheral portion of said flexible tube inwardly to provide a space therearound permitting the entry of air through the said inlet means and past the said tubing periphery into the casing.

6. In a backflow preventer of the character described, the combination including a casing having an inlet and an outlet, a ported spider structure positioned within an enlarged portion of the casing between said inlet and outlet, air inlet means adjacent the inlet end of the casing, a flexible tube rigidly secured to the casing inlet and folded back on itself so that the inner portion acts as a water delivery tube into the casing, a ferrule cooperating with the said spider structure to hold the flexible tube in place, the ferrule being receivable within an apertured portion of the said spider, the outer portion of the said flexible tube serving as a valve for the said inlet means, the casing having an inner reduced peripheral wall portion below said air inlet means, the said flexible tube being responsive to fluid flow therethrough to make annular contact with the said reduced peripheral wall of the casing between the inlet and the outlet, air inlet ports arranged around the flexible tube and above the said reduced annular portion of the casing, the air inlet means and air inlet ports being located between the casing inlet and the spider structure, the said air inlet means, the air inlet ports and the casing outlet being in communication whereby upon expansion of the said flexible tube the air inlet ports are cut off from communication with the interior of the said casing below the said reduced annular portion of the latter member.

GEORGE E. HANSEN.

References Cited in the file of this patent

UNITED STATES PATENTS

| Number | Name | Date |
|---|---|---|
| 225,776 | Wilson | Mar. 23, 1880 |
| 2,150,471 | Van Vulpen | Mar. 14, 1939 |
| 2,347,988 | Burke | May 2, 1944 |
| 2,382,427 | Langdon | Aug. 14, 1945 |
| 2,395,906 | Owens | Mar. 5, 1946 |
| 2,470,744 | Korn | May 17, 1949 |

FOREIGN PATENTS

| Number | Country | Date |
|---|---|---|
| 565,539 | Great Britain | of 1944 |